June 7, 1938.  J. F. SOPER  2,119,755
INDEPENDENT FRONT WHEEL SPRINGING SYSTEM FOR MOTOR DRIVEN VEHICLES
Filed Aug. 28, 1936   2 Sheets-Sheet 2
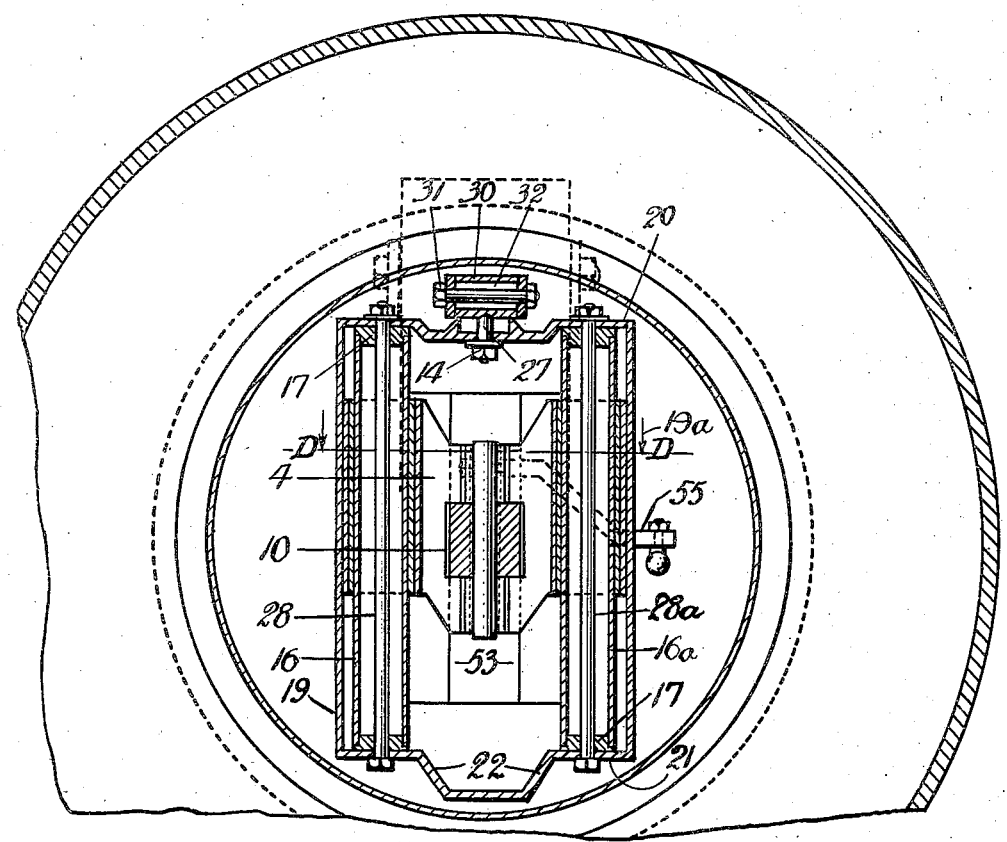
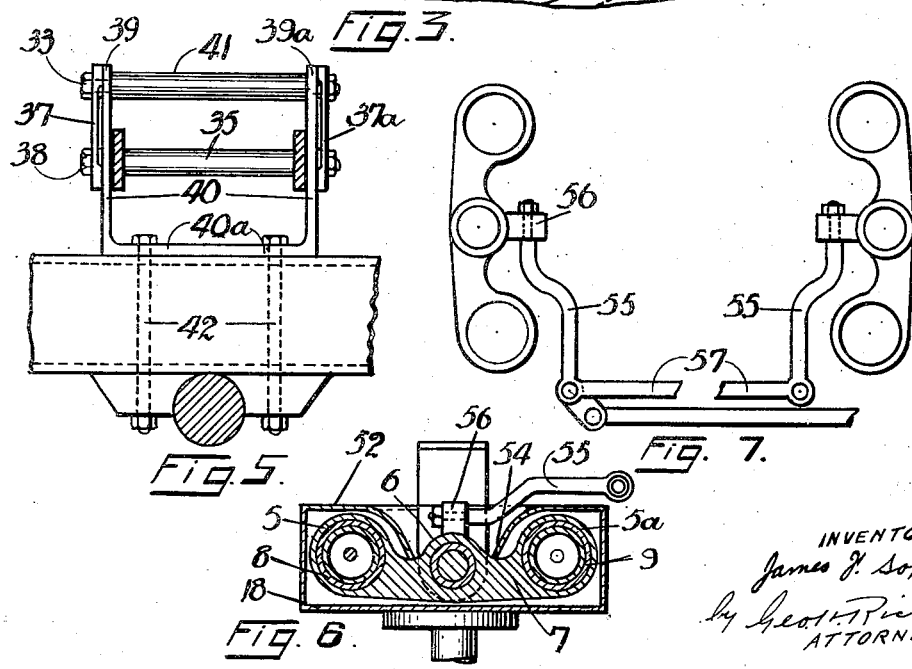
INVENTOR.
James F. Soper
ATTORNEY Patented June 7, 1938

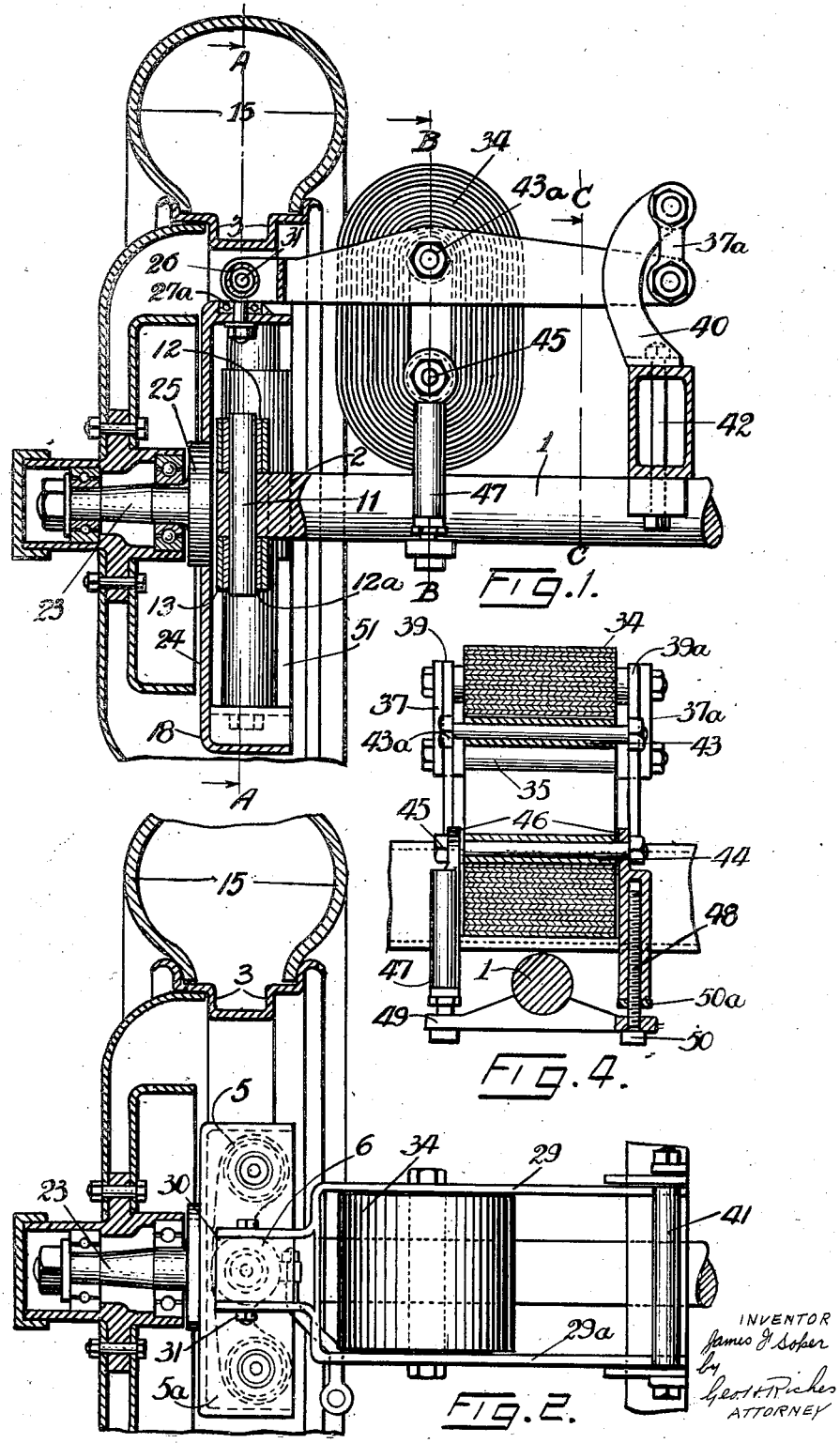

2,119,755

UNITED STATES PATENT OFFICE 2,119,755

INDEPENDENT FRONT WHEEL SPRINGING SYSTEM FOR MOTOR DRIVEN VEHICLES

James Frederick Soper, Balclutha, New Zealand

Application August 28, 1936, Serial No. 98,363
In New Zealand January 21, 1936

5 Claims. (Cl. 280—96.2)

This invention relates to springing the wheels of motor cars and motor driven vehicles. The object of the invention is to provide an independent system of springing, by means of which the front wheels, under the restraint of rubber springs, move vertically upwards and/or downwards relative to the frame of the vehicle. Moreover, this upward and downward displacement of one or both wheels, in relation to the frame, may be of considerable extent, but has no effect on the steering, as the steering gear is mounted directly on the axle beam which forms part of the frame. Furthermore, with my independent springing system, the caster angle is not altered, nor is the centre point steering affected, or the wheel camber altered, nor is the parallelism of the wheels affected by movement of the springing system.

The above and other objects of the invention will be readily apparent from a perusal of the specific description which is to follow, and the claims.

In the accompanying drawings:—

Figure 1 represents a part vertical section and part side elevation of the springing system.

Figure 2 is a part transverse section of one wheel showing a plan of the springing system.

Figure 3 is a part sectional elevation of a wheel and springing system on the line A—A in Figure 1.

Figure 4 is a sectional elevation of the springing system on the line B—B in Figure 1.

Figure 5 is a sectional elevation of the springing system on the line C—C in Figure 1.

Figure 6 is a transverse section of that portion of the springing device within the wheel on the line D—D in Figure 3.

Figure 7 is a diagrammatic view of the steering arms and rods.

Referring to the drawings, the invention is characterized by a construction in which the axle beam 1 is disposed transversely under or over the longitudinal frame members of the vehicle and rigidly attached to the frame members.

The end 2 of the axle beam 1 extends outward into the centre plane of the wheel 3 which is deeply dished.

A double guide block 4 of substantial construction, which may be a casting or forging, is formed with partly cylindrical portions as at 5 and 5a at each end of the centre boss 6 joined thereto by webs 7. These end cylindrical portions of the guide block 4 are each formed with a bore into which bushes or sleeves 8 and 9 are driven.

The double guide block 4 is formed with a central opening 10 therethrough to accommodate the end 2 of the axle beam 1, the guide block being pivotally mounted on a pin 11 in the end of the axle beam. A portion of the pin 11 extends above and below the axle beam, the upper extension engaging in a bush 12 and the lower extension engaging in a bush 12a provided in the bore 13 of the central boss 6 of the guide block. As the pivot pin 11 has to be passed an easy fit into the bushes 12 and 12a, the centre portion of the pin 11 may be secured in position in the bore in the end 2 of the axle beam by means of a set screw, tapered pin or the like.

The vertical axis of the pivot pin 11 is aligned with the centre of the tyre tread 15 of the wheel 3.

Two cylindrical tubular members 16 and 16a are provided, one engaging in the bore of the bush 8, the other in the bore of the bush 9 in the guide block 4, the tubular members being closed at their ends by means of spigoted washers 17.

The brake anchorage plate 18 is shaped as shown in Figure 3 of the drawings and is surrounded by a rim, the rim extending outwardly a sufficient distance to house the guide block 4; the sides 19 and 19a are straight and parallel to each other, the upper end 20 is formed to support a universal joint 26 the lower end 21 being formed with a central channel shaped recess 22 to allow for a greater up and down displacement of the wheel 3 relative to the guide block 4.

A stub axle 23, on which the wheel 3 is free to revolve, extends outward at right angles from the outer surface 24 of the brake anchorage plate 18. The stub axle may form an integral part of the anchorage plate, or it may be secured thereto by welding the flange 25 of the axle to the face of the plate 18.

The universal T shaped joint 26 is disposed in the upper end plate 20, the vertical pivot pin 27 thereof is in alignment with the pivot pin 11 in the end 2 of the axle beam. The load is carried on a ball or roller bearing 27a disposed on the vertical pin 27 and resting in a recess provided in the upper end plate 20 between the upper surface of the end plate and the horizontal surface of the universal joint. The vertical pivot pin 27 is secured to the underside of the end plate 20 by means of a nut 14 with a thrust washer interposed between the under surface of the plate 20 and the nut.

The circular tubular members 16 and 16a each engage in their respective bushes 8 and 9. When the guide block 4 is mounted on the pivot pin 11 in the end 2 of the axle beam 1, and the brake anchorage plate 18 passed onto the guide block 4, between the closed ends of the tubular members 16 and 16a, the end surface of the washers 17 on the tubular members 16 and 16a contact with the inner surfaces of the upper and lower plate 20 and 21, and secured therein, at the front and rear of the pivot pin 11, by means of clamping bolts 28 and 28a securing the guide block 4 with its tubular members to the upper and lower end plates of the anchorage plate 18.

A lever is provided consisting of two plates 29 and 29a, the outer ends of which are spaced to be passed onto the ends of the horizontal part 30 of the universal joint 26 and pivotally mounted thereto on a pin 31 secured by means of a nut. To reduce friction the pin 31 may be provided with needle rollers or such like disposed in the recess 32 around the pin 31.

The plates 29 and 29a of the lever, beyond the anchorage plate, are spaced wider apart to permit of a rubber tension spring 34 being passed between them. To stiffen the lever plates at their inner ends, a sleeve or distance piece 35 is provided and disposed between them, each inner end of the lever plates is pivotally mounted to the lower end of a link or shackle 37 and 37a, a bolt 38 securing the link and sleeve in position. The upper end of each link or shackle 37 and 37a is pivoted to the eyes 39 and 39a of a bracket 40, a sleeve or distance piece 41 is disposed between the upper eyes of the bracket 40, a bolt 33 being passed into the links 37 and 37a, eyes 39 and 39a of the bracket 40 and sleeve 41 secured therein by means of a nut.

The base 40a of the bracket 40 is secured to a side frame of the vehicle by means of bolts 42. The rubber tension spring 34 may be moulded and formed to the required section, or it may be constructed by having a band of rubber of the required width and thickness, wound, under increasing tension, round the upper and lower sleeves 43 and 44, kept apart, while winding the band thereon, by means of a removable spacing block between the two sleeves, forming a laminated spring.

The coils or layers of band forming the laminated rubber spring may be prevented from uncoiling by means of one or more endless rubber bands stretched around and over the outer coil of the spring or by any other suitable means.

As hereinbefore mentioned the rubber spring is disposed between the sides 29 and 29a of the lever, a substantial bolt 43a is then passed through holes in the sides of the lever and the sleeve 43 secured therein by means of a nut. The lower sleeve 44, in the rubber spring 34, is securely held in position by means of a substantial bolt 45 passed through holes in each lug 46 of a tension screw 47 disposed at each side of the rubber spring, each tension screw is provided with a threaded bore 48. The rubber spring may be enclosed in a suitable case to protect it from the weather conditions or oil.

A substantial bar or lug 49 is rigidly secured to the axle beam 1 which is provided with a hole at each side, the centres of the holes being aligned with the centres of the threaded bores 48 in the sleeves 47. A threaded bolt 50 is passed into each hole and engages in the threaded bore 48 of its tension screws, provided with a lock nut 50a to prevent the threaded bolts 50 from slackening.

The double guide block 4 is housed in the space 51 bounded by the projecting rim around the brake anchorage plate. The partially enclosed space 51 may be completely enclosed by providing a cover plate 52 over the opening 51, a cross section of which is shown in Figure 6 of the drawings. The guard plate 52 may be secured to the surrounding rim of the anchorage plate by means of screws or other well-known means. An opening 53 is formed in the guard plate 52 to allow for the up and/or down displacement of the wheel 3 relative to the axle beam 1. This opening may be formed by making a central longitudinal and transverse slit in the plate of the required length and width, the parts are bent round, one to the right hand, the other to the left hand until each edge 54 thereof contacts with the outer surface of a web 7 of the double guide block 4. The portions of the guard plate 52, above and below the opening 53, extend across the opening of the brake anchorage plate.

The opening 53, above and/or below the end portion 2 of the axle beam, may be covered with bellows shaped screens or dust guards (not shown in the drawings) made of flexible material. The bellows portion may be secured to the upper and lower ends of the anchorage plate, the inner ends to the double guide block 4.

The whole springing system is inclined slightly backward at the top, to the rear of the vehicle, to provide caster action to the steering gear. The up and down displacement of the wheel is always in line with the steering pivot, as the steering pivot and double guide block are inclined at the same angle.

The steering is affected from the steering mechanism through connections with an arm 55 formed with a tapered end to engage a corresponding tapered bore in a lug 56 and is secured therein by means of a nut. This lug projects from the boss 6 of the double guide block.

The wheels 3 are caused to turn in unison on the pivot pin 11 by coupling the arms 55 with a tie or track rod 57.

Means is provided for lubricating the bushes or sleeves 8 and 9 in the double guide block 4 in which the tubular members 16 and 16a slidably engage, and the upper and lower portions of the pivot pin 11 which engage in the bushes 12 and 12a in the centre boss 6 of the double guide block 4, by providing oil wells or the like in a suitable position having oil ways or pipes leading therefrom to the rubbing surfaces of the wearing part.

A rubber block may be provided in a suitable position on the axle beam so as to prevent clashing on recoil. A shock-absorber may be fitted between the sides 29 and 29a of the lever and the axle beam.

The aforementioned description of the springing system applies only to one front wheel. It will be understood, however, that the opposite front wheel is provided with a duplicate mechanism.

The method of operation is as follows:—The vehicle when moving over road inequalities allows the front wheels to move independently and vertically up or down, relative to the frame of the vehicle, under the restraint of rubber springs acting on the wheels through levers.

The wheels are retained in the operative position by means of double tubular members attached to the brake anchorage plate which move up or down with the wheels, the tubular members sliding vertically in the sleeves in the guide block, the guide block turning horizontally under control of the steering gear, the steering gear moving up or down with the frame of the vehicle but not with the wheels.

Having thus fully described my invention, what I claim as new and desire to secure by Letters Patent is:—

1. An independent front wheel springing system comprising a double guide block having a central boss and front and rear bosses, a central transverse opening through said block to accommodate the outer end portion of an axle beam, a pin in the end portion of the said axle beam, the upper and lower extensions thereof engaging in the bores formed in the said central boss, a brake anchorage plate having projecting sides and ends thereon, guides members slidably engaging with the front and rear bosses of the guide block, the said guide block and guide members being housed within said brake anchorage plate, and clamping bolts securing the said guide members to the upper and lower projecting ends of the said brake anchorage plate.

2. In an independent front wheel springing system according to claim 1 comprising double levers pivotally mounted at their ends on suspension links supported on said axle beam, the outer ends of the said levers being pivotally mounted to a universal joint in the upper end of the brake anchorage plate, spring means acting on the levers and means to adjust the tension of said spring.

3. An independent front wheel springing system comprising a guide block pivotally mountable on an axle beam, a wheel supporting brake anchorage plate, guide members secured to said plate and slidably engaged by said guide block for up and down movement and resilient means restraining the up and down movement of said plate, said means comprising a lever, one end of which is pivotally supported on said axle beam and the other end is pivotally attached to said anchorage plate and spring means acting on said lever.

4. An independent front wheel springing system comprising a guide block pivotally mountable on an axle beam, a wheel supporting brake anchorage plate, guide members secured to said plate and slidably engaged by said guide block for up and down movement and resilient means restraining the up and down movement of said plate, said means comprising a lever formed of a pair of spaced arms, one end of said lever being pivotally fulcrumed to said axle beam and the opposite end being pivotally connected to said plate, a sleeve disposed between and secured to said arms between the ends of said lever and spring means secured to said sleeve and said axle beam restraining movement of said lever.

5. An independent front wheel springing system comprising a guide block pivotally mountable on an axle beam, a wheel supporting brake anchorage plate, guide members secured to said plate and slidably engaged by said guide block for up and down movement and resilient means restraining the up and down movement of said plate, said means comprising a lever formed of a pair of spaced arms, one end of said lever being pivotally fulcrumed to said axle beam and the opposite end being pivotally connected to said plate, a sleeve disposed between and secured to said arms between the ends of said lever, a laminated tension spring carried by said sleeve and means for adjusting the tension of said spring comprising a second sleeve centrally disposed in the lower portion of said spring, an internally threaded tension screw at each side of said spring, a lug on each tension screw attached to opposite ends of said second mentioned sleeve, a bar on said axle beam, a hole in each end of said bar and a threaded pin in each said hole engaging the thread of said tension screw.

JAMES FREDERICK SOPER.